US012641014B2

(12) United States Patent
Xu et al.

(10) Patent No.: US 12,641,014 B2
(45) Date of Patent: May 26, 2026

(54) BIER MESSAGE FORWARDING METHOD AND APPARATUS, AND STORAGE MEDIUM

(71) Applicant: ZTE CORPORATION, Shenzhen (CN)

(72) Inventors: Benchong Xu, Shenzhen (CN); Zheng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 114 days.

(21) Appl. No.: 18/713,825

(22) PCT Filed: Aug. 5, 2022

(86) PCT No.: PCT/CN2022/110685
§ 371 (c)(1),
(2) Date: May 28, 2024

(87) PCT Pub. No.: WO2023/098132
PCT Pub. Date: Jun. 8, 2023

(65) Prior Publication Data
US 2025/0030632 A1　Jan. 23, 2025

(30) Foreign Application Priority Data
Dec. 2, 2021　(CN) .......................... 202111462084.7

(51) Int. Cl.
　*H04L 45/50*　(2022.01)
　*H04L 45/00*　(2022.01)
(52) U.S. Cl.
　CPC ............. *H04L 45/50* (2013.01); *H04L 45/34* (2013.01)
(58) Field of Classification Search
　CPC .......... H04L 45/50; H04L 45/34; H04L 45/04
　See application file for complete search history.

(56) References Cited

U.S. PATENT DOCUMENTS 11,140,074 B2　10/2021　Filsfils et al.
2016/0127139 A1*　5/2016　Tian ........................ H04L 45/16
　　　　　　　　　　　　　　　　　370/390
(Continued)

FOREIGN PATENT DOCUMENTS

CN　　106656794 A　　5/2017
CN　　110784411 A　　2/2020
(Continued)

OTHER PUBLICATIONS

International Searching Authority. International Search Report and Written Opinion for PCT Application No. PCT/CN2022/110685 and English translation, mailed Oct. 26, 2022, pp. 1-10.
(Continued)

*Primary Examiner* — Caroline H Jahnige
(74) *Attorney, Agent, or Firm* — Vivacqua Crane, PLLC

(57) ABSTRACT

Disclosed are a method and apparatus for forwarding a Bit Index Explicit Replication (BIER) packet, and a storage medium. The method may include: receiving a first BIER packet generated by a third node, wherein the first BIER packet comprises a first BIER packet header and a BIER segment list, the first BIER packet header comprises first node information, and the BIER segment list comprises second node information; changing the first node information in the first BIER packet header into the second node information to obtain a second BIER packet header; and forwarding a second BIER packet corresponding to the second BIER packet header to a second node corresponding to the second node information.

8 Claims, 7 Drawing Sheets

(56)     References Cited

U.S. PATENT DOCUMENTS

| | | |
|---|---|---|
| 2018/0278521 A1* | 9/2018 | Pfister ..................... H04L 69/22 |
| 2018/0367456 A1 | 12/2018 | Wijnands et al. |
| 2022/0109623 A1* | 4/2022 | Xie ....................... H04L 45/745 |

FOREIGN PATENT DOCUMENTS

| | | | |
|---|---|---|---|
| CN | 112491718 A | 3/2021 |
| CN | 113014486 A | 6/2021 |
| CN | 112054959 B | 11/2021 |
| WO | 2021063232 A1 | 4/2021 |

OTHER PUBLICATIONS

Internet Engineering Task Force (IETF). "Multicast Using Bit Index Explicit Replication (BIER)," REC 8279, Nov. 2017, pp. 1-43.
European Patent Office. Extended European Search Report for EP Application No. 22899952.0, mailed Feb. 7, 2025, pp. 1-11.
Industrial Property Cooperation Center (IPCC). Search Report for JP Application No. 2024-522695 and English translation, mailed Jan. 14, 2025, pp. 1-34.
Japan Patent Office. Notice of Reasons for Refusal for JP Application No. 2024-522695 and English translation, mailed Feb. 7, 2025, pp. 1-12.

* cited by examiner

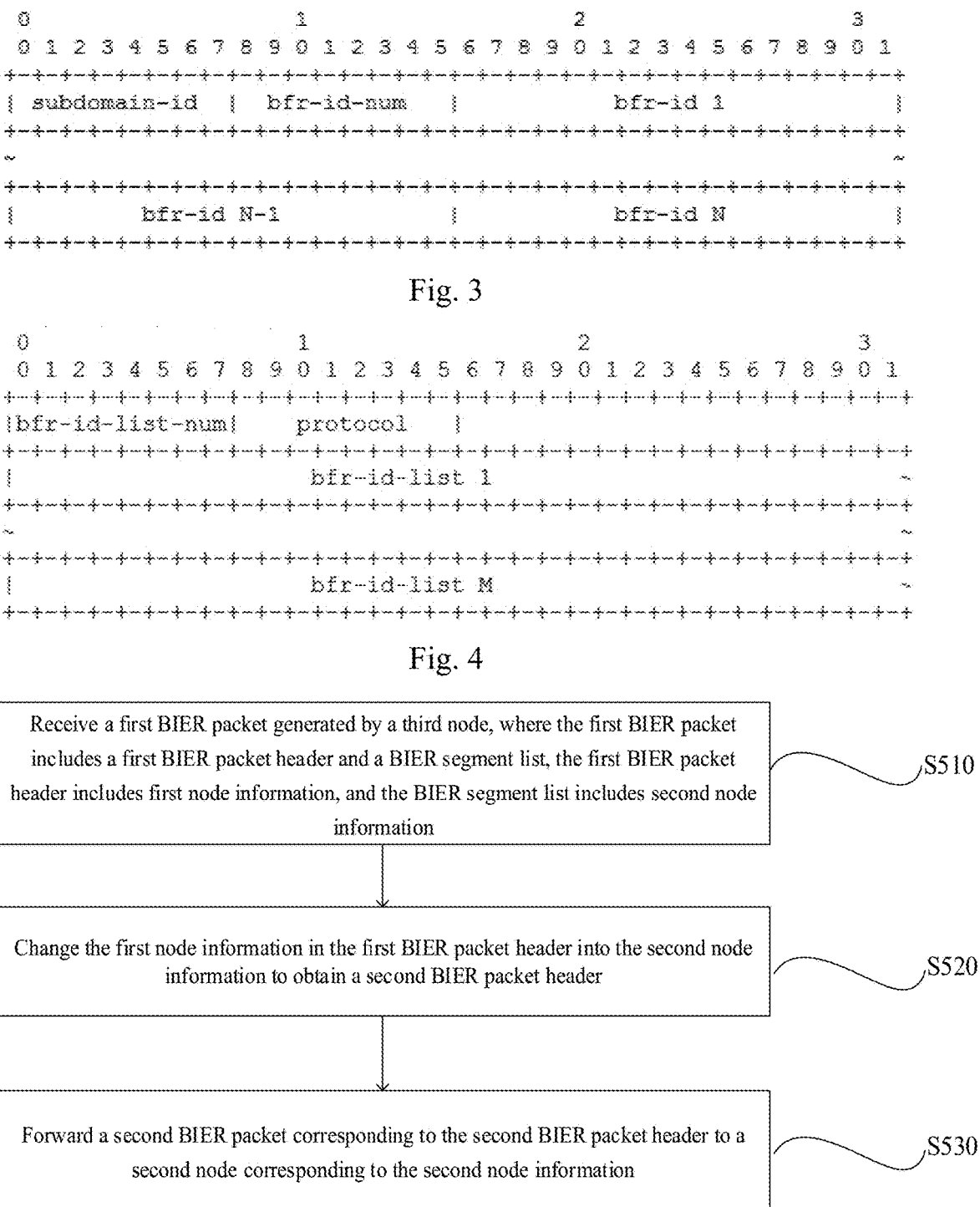

Receive a first BIER packet generated by a third node, where the first BIER packet includes a first BIER packet header and a BIER segment list, the first BIER packet header includes first node information, and the BIER segment list includes second node information — S510

Change the first node information in the first BIER packet header into the second node information to obtain a second BIER packet header — S520

Forward a second BIER packet corresponding to the second BIER packet header to a second node corresponding to the second node information — S530

Fig. 5

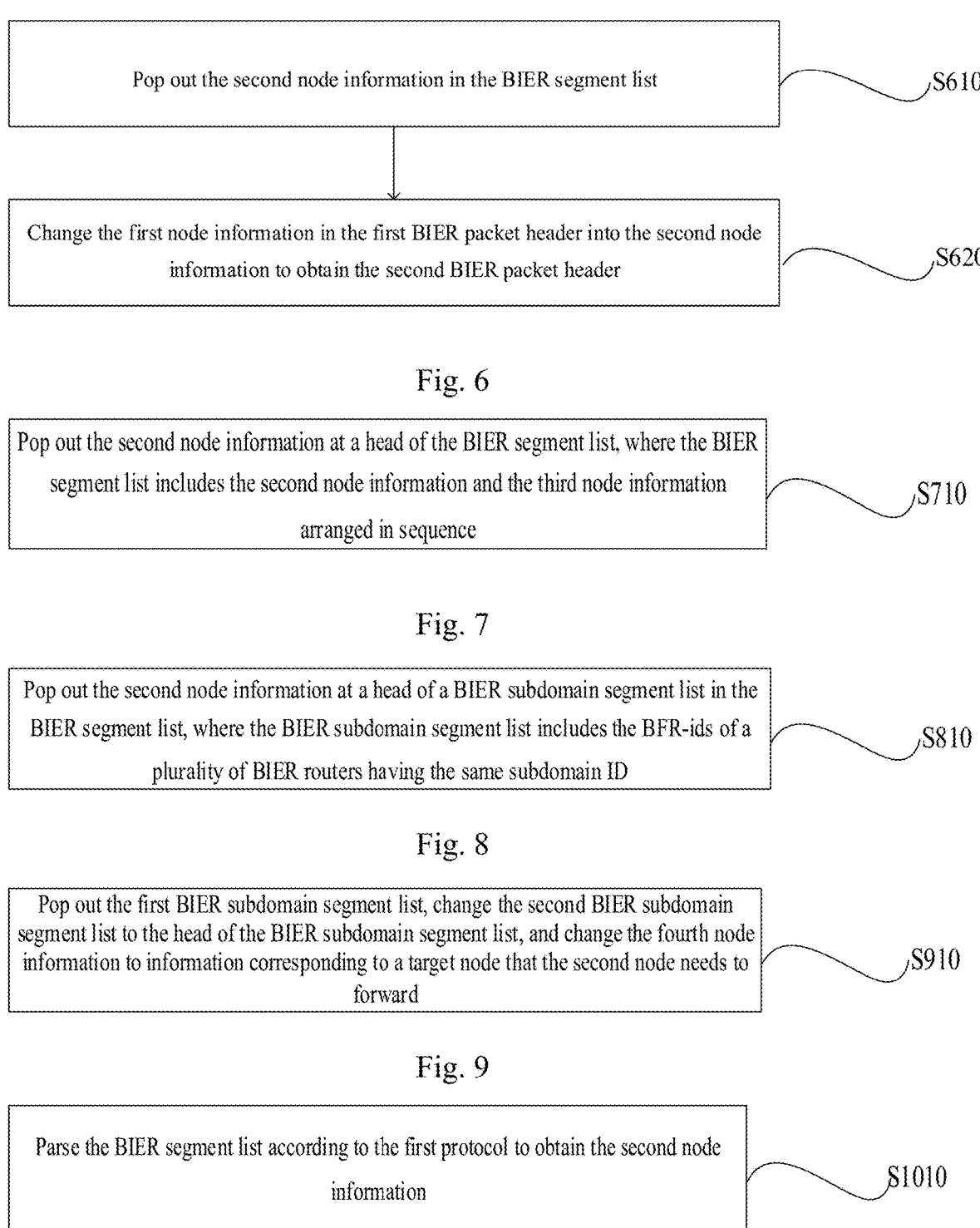

Pop out the second node information in the BIER segment list                    S610

Change the first node information in the first BIER packet header into the second node information to obtain the second BIER packet header                    S620

Fig. 6

Pop out the second node information at a head of the BIER segment list, where the BIER segment list includes the second node information and the third node information arranged in sequence                    S710

Fig. 7

Pop out the second node information at a head of a BIER subdomain segment list in the BIER segment list, where the BIER subdomain segment list includes the BFR-ids of a plurality of BIER routers having the same subdomain ID                    S810

Fig. 8

Pop out the first BIER subdomain segment list, change the second BIER subdomain segment list to the head of the BIER subdomain segment list, and change the fourth node information to information corresponding to a target node that the second node needs to forward                    S910

Fig. 9

Parse the BIER segment list according to the first protocol to obtain the second node information                    S1010

Fig. 10

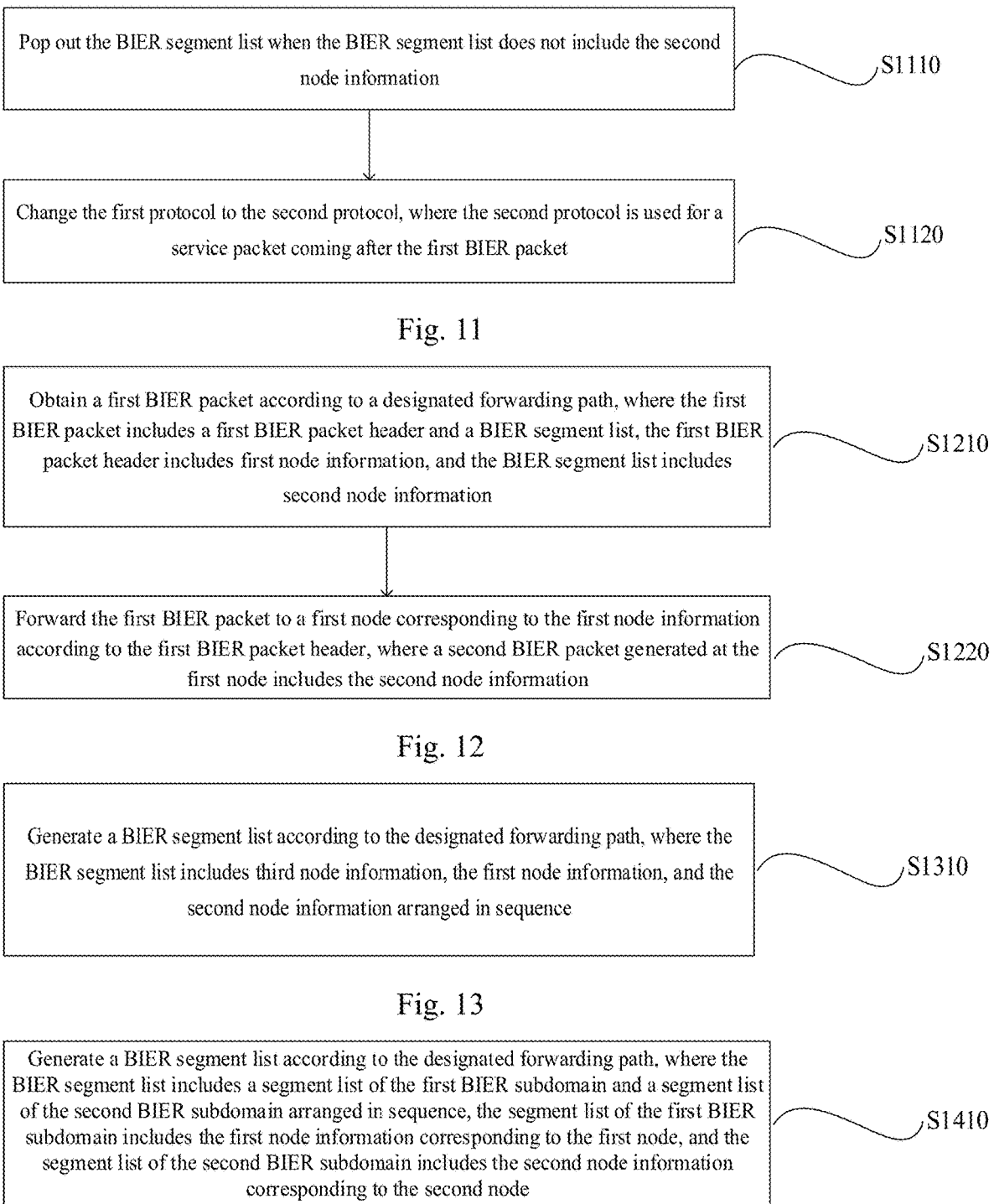

Pop out the BIER segment list when the BIER segment list does not include the second node information                    S1110

Change the first protocol to the second protocol, where the second protocol is used for a service packet coming after the first BIER packet                    S1120

Fig. 11

Obtain a first BIER packet according to a designated forwarding path, where the first BIER packet includes a first BIER packet header and a BIER segment list, the first BIER packet header includes first node information, and the BIER segment list includes second node information                    S1210

Forward the first BIER packet to a first node corresponding to the first node information according to the first BIER packet header, where a second BIER packet generated at the first node includes the second node information                    S1220

Fig. 12

Generate a BIER segment list according to the designated forwarding path, where the BIER segment list includes third node information, the first node information, and the second node information arranged in sequence                    S1310

Fig. 13

Generate a BIER segment list according to the designated forwarding path, where the BIER segment list includes a segment list of the first BIER subdomain and a segment list of the second BIER subdomain arranged in sequence, the segment list of the first BIER subdomain includes the first node information corresponding to the first node, and the segment list of the second BIER subdomain includes the second node information corresponding to the second node                    S1410

Fig. 14

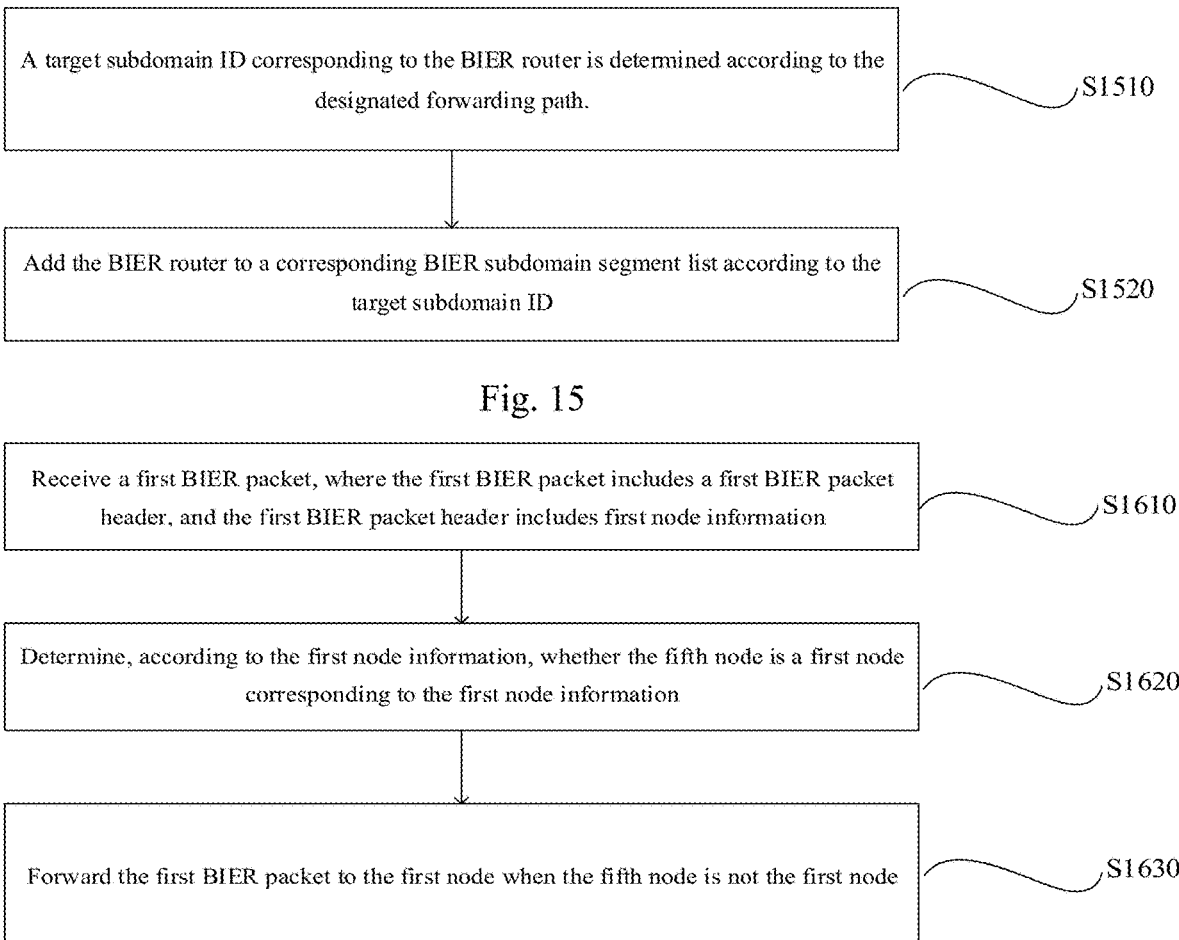

A target subdomain ID corresponding to the BIER router is determined according to the designated forwarding path. — S1510

Add the BIER router to a corresponding BIER subdomain segment list according to the target subdomain ID — S1520

Fig. 15

Receive a first BIER packet, where the first BIER packet includes a first BIER packet header, and the first BIER packet header includes first node information — S1610

Determine, according to the first node information, whether the fifth node is a first node corresponding to the first node information — S1620

Forward the first BIER packet to the first node when the fifth node is not the first node — S1630

Fig. 16

BIER MESSAGE FORWARDING METHOD AND APPARATUS, AND STORAGE MEDIUM

CROSS-REFERENCE TO RELATED APPLICATION

This application is a national stage filing under 35 U.S.C. § 371 of international application number PCT/CN2022/110685, filed Aug. 5, 2022, which claims priority to Chinese patent application No. 202111462084.7 filed Dec. 2, 2021. The contents of these applications are incorporated herein by reference in their entirety.

TECHNICAL FIELD

The present disclosure relates to the technical field of communications, and more particularly, to a method and apparatus for forwarding a Bit Index Explicit Replication (BIER) packet, and a storage medium.

BACKGROUND

After the development of Internet Protocol (IP) multicast forwarding, BIER began to develop gradually. Unlike conventional multicast tree technologies, in BIER, a bitstring identifying destination nodes is carried in a packet to identify receivers, and then target nodes of BIER forwarding are determined according to forwarding entries on these bits. The BIER technology supports various encapsulation types and the interworking of these encapsulation types.

Currently, forwarding along a designated path in a network is generally implemented through Segment Routing (SR). For example, forwarding along a designated path is implemented through Segment Routing-Multiprotocol Label Switching (SR-MPLS) in an MPLS network, and implemented through SRv6 in an IPv6 network. Different protocols correspond to different path information, and segmented routing using different encapsulation technologies is applicable only to the corresponding networks. Existing segment routing technologies cannot be used to forward packets that need to pass through IPv6, IPv4, MPLS and other networks. Consequently, there is a need to provide a method for segment routing in a BIER network that supports various encapsulation types.

SUMMARY

The following is a summary of the subject matter set forth in this description. This summary is not intended to limit the scope of protection of the claims.

Embodiments of the present disclosure provide a method and apparatus for forwarding a BIER packet, and a storage medium.

In accordance with a first aspect of the present disclosure, an embodiment provides a method for forwarding a BIER packet, applied to a first node, the method including: receiving a first BIER packet generated by a third node, where the first BIER packet includes a first BIER packet header and a BIER segment list, the first BIER packet header includes first node information, and the BIER segment list includes second node information; changing the first node information in the first BIER packet header into the second node information to obtain a second BIER packet header; and forwarding a second BIER packet corresponding to the second BIER packet header to a second node corresponding to the second node information.

In accordance with a second aspect of the present disclosure, an embodiment provides a method for forwarding a BIER packet, applied to a third node, the method including: obtaining a first BIER packet according to a designated forwarding path, where the first BIER packet includes a first BIER packet header and a BIER segment list, the first BIER packet header includes first node information, and the BIER segment list includes second node information; and forwarding the first BIER packet to a first node corresponding to the first node information according to the first BIER packet header, where a second BIER packet generated at the first node includes the second node information.

In accordance with a third aspect of the present disclosure, an embodiment provides a method for forwarding a BIER packet, applied to a fifth node in a BIER network, the method including: receiving a first BIER packet, where the first BIER packet includes a first BIER packet header, and the first BIER packet header includes first node information; determining, according to the first node information, whether the fifth node is a first node corresponding to the first node information; and forwarding the first BIER packet to the first node in response to the fifth node being not the first node.

In accordance with a fourth aspect of the present disclosure, an embodiment provides an apparatus for forwarding a BIER packet, including: a memory, a processor, and a computer program stored in the memory and executable by the processor, where the computer program, when executed by the processor, causes the processor to implement the method for forwarding a BIER packet in accordance with the embodiment of any one of the first aspect, the second aspect, or the third aspect of the present disclosure.

In accordance with a fifth aspect of the present disclosure, an embodiment provides a computer-readable storage medium, storing a computer-executable instruction which, when executed by a processor, causes the processor to implement the method for forwarding a BIER packet in accordance with the embodiment of any one of the first aspect, the second aspect, or the third aspect of the present disclosure.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and are not intended to limit the technical schemes of the present disclosure.

FIG. 3 is a structural diagram of a BIER subdomain segment list in a BIER segment list structure in a BIER packet according to another embodiment of the present disclosure;

FIG. 4 is a diagram showing a BIER segment list structure in a BIER packet according to another embodiment of the present disclosure;

FIG. 5 is a flowchart of steps of a method for forwarding a BIER packet according to another embodiment of the present disclosure;

FIG. 6 is a detailed flowchart of step S520 in FIG. 5 according to another embodiment of the present disclosure;

FIG. 7 is a detailed flowchart of step S610 in FIG. 6 according to another embodiment of the present disclosure;

FIG. 8 is a detailed flowchart of step S710 in FIG. 7 according to another embodiment of the present disclosure;

FIG. 9 is a flowchart of an additional step after step S810 in FIG. 8 according to another embodiment of the present disclosure;

FIG. 10 is a detailed flowchart of steps of a method for forwarding a BIER packet according to another embodiment of the present disclosure;

FIG. 11 is a flowchart of an additional step after step S520 in FIG. 5 according to another embodiment of the present disclosure;

FIG. 12 is a flowchart of steps of a method for forwarding a BIER packet, which is applied to a third node, according to another embodiment of the present disclosure;

FIG. 13 is a detailed flowchart of step S1210 in FIG. 12 according to another embodiment of the present disclosure;

FIG. 14 is another detailed flowchart of step S1210 in FIG. 12 according to another embodiment of the present disclosure;

FIG. 15 is a flowchart of additional steps of the method for forwarding a BIER packet in FIG. 12 according to another embodiment of the present disclosure;

FIG. 16 is a flowchart of steps of a method for forwarding a BIER packet, which is applied to a fifth node, according to another embodiment of the present disclosure;

DETAILED DESCRIPTION

Figure 1:
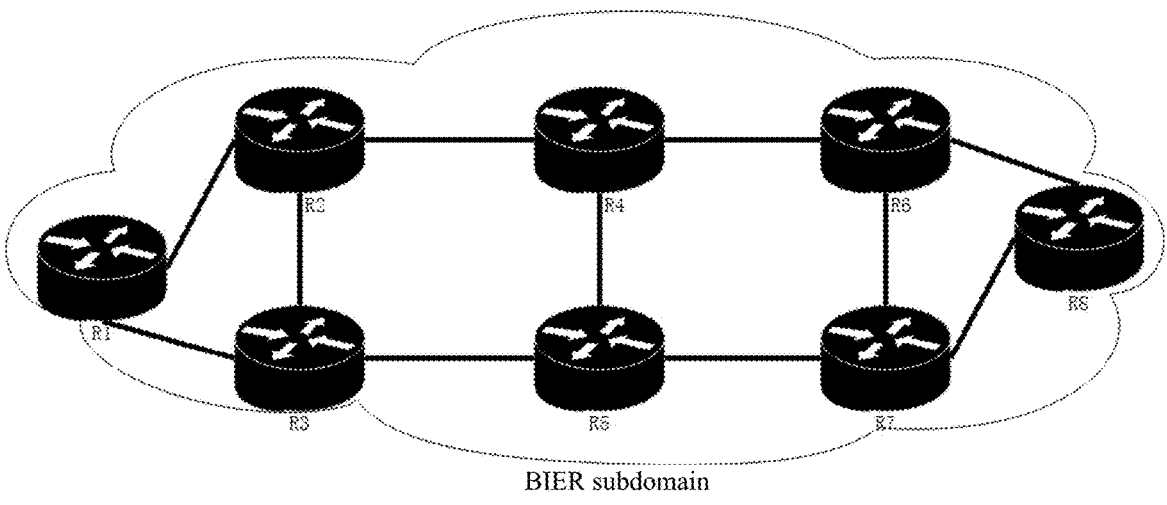
FIG. 1 is a diagram of networking of a BIER subdomain according to an embodiment of the present disclosure.

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

Embodiments of the present disclosure provide a method and apparatus for forwarding a BIER packet, and a storage medium. The method for forwarding a BIER packet is applied to a first node and includes: receiving a first BIER packet generated by a third node, where the first BIER packet includes a first BIER packet header and a BIER segment list, the first BIER packet header includes first node information, and the BIER segment list includes second node information; changing the first node information in the first BIER packet header into the second node information to obtain a second BIER packet header; and forwarding a second BIER packet corresponding to the second BIER packet header to a second node corresponding to the second node information. Address information of a target node is determined according to forwarding path information encapsulated in a BIER packet header, such that an effect of segment routing is achieved in a BIER network supporting various encapsulation types, to realize a function of forwarding along a designated path.

It can be understood that compared with conventional IP multicast forwarding technologies that use multicast trees for multicast, in BIER, a bitstring identifying destination nodes is carried in a packet to identify receivers, enabling the BIER technology to support interworking of various encapsulation types such as mpls, ipv6, ether, etc.

In order to realize a variety of new applications such as deterministic network, computing power network, service chain, etc., there is often a need for forwarding along a designated path. Conventionally, the function of forwarding along a designated path is realized through SR. For example, forwarding along a designated path is implemented through SR-MPLS in an MPLS network, and implemented through SRv6 in an IPv6 network.

Because the BIER technology supports the interworking of various encapsulation types such as mpls, ipv6, ether, etc., a packet in the BIER network may need to pass through IPv6, IPv4, MPLS, and other networks. However, in conventional technologies, SR requires determining a path address of a target router according to the corresponding encapsulation technology. As a result, in conventional technologies, SR cannot determine the path address of the target router and realize a segment routing function for packets in a BIER network that need to pass through IPv6, IPv4, MPLS, and other networks.

In view of the above problems, the present disclosure proposes a method for forwarding a BIER packet, to determine a path address of a target router and realize a segment routing function for packets in a BIER network that need to pass through IPv6, IPv4, MPLS, and other networks.

It should be noted that the BIER technology provides an encapsulation mode for a BIER packet header. A bitstring in the BIER packet header carries routing information of target nodes. A current node may identify receiving nodes according to the bitstring in the BIER packet header, to realize unicast or multicast to the target nodes.

In the process of forwarding through the BIER technology, a BIER route also includes Bit Forwarding Ingress Routers (BFIRs), Bit Forwarding Routers (BFRs), and Bit Forwarding Egress Routers (BFERs). BFIR represents an ingress node of traffic, BFER represents an egress node of the traffic, and BFR represents an intermediate node for forwarding the traffic. BFIR and BFER represent the flow direction of traffic in the BIER network. In the existing BIER technology, BFR-ids corresponding to BFERs are stored in a BIER packet. Before multicast or unicast, related data is generated through flooding in a BIER domain, such that a BFIR node can unicast or multicast the BIER packet to the corresponding target node according to BFER information alone. However, the BIER packet generated at the BFIR can be unicast or multicast to the corresponding BFER node only. Consequently, forwarding along a designated path cannot be realized.

To solve the above problems, the present disclosure discloses a method and apparatus for forwarding a BIER packet, and a storage medium.

The embodiments of the present disclosure will be further described in detail below with reference to the accompanying drawings.

FIG. 1 is a diagram of networking of a BIER subdomain according to an embodiment of the present disclosure.

If a BIER packet needs to pass through multiple nodes in a BIER domain during forwarding, the forwarding of the BIER packet is considered as forwarding along a designated path. For example, a service packet one needs to be forwarded through a designated path that passes through nodes R1, R2, R4, R6, and R8. Nodes R1 to R8 are routing nodes capable of realizing a BIER network function. In the process of forwarding the service packet, R1 forwards the packet to R2, R2 forwards the packet to R4, R4 forwards the packet to R6, and R6 forwards the packet to R8. In each forwarding step, BFER information in the packet corresponds to target node information, thereby realizing forwarding along a designated path. For example, R2 is equivalent to a BFER node of R1, and R8 is equivalent to a BFER node of R6.

It can be understood that FIG. 1 shows forwarding along a designated path in a single BIER subdomain, and each routing node is identified with its bfd-id during the forwarding process.

Figure 2:
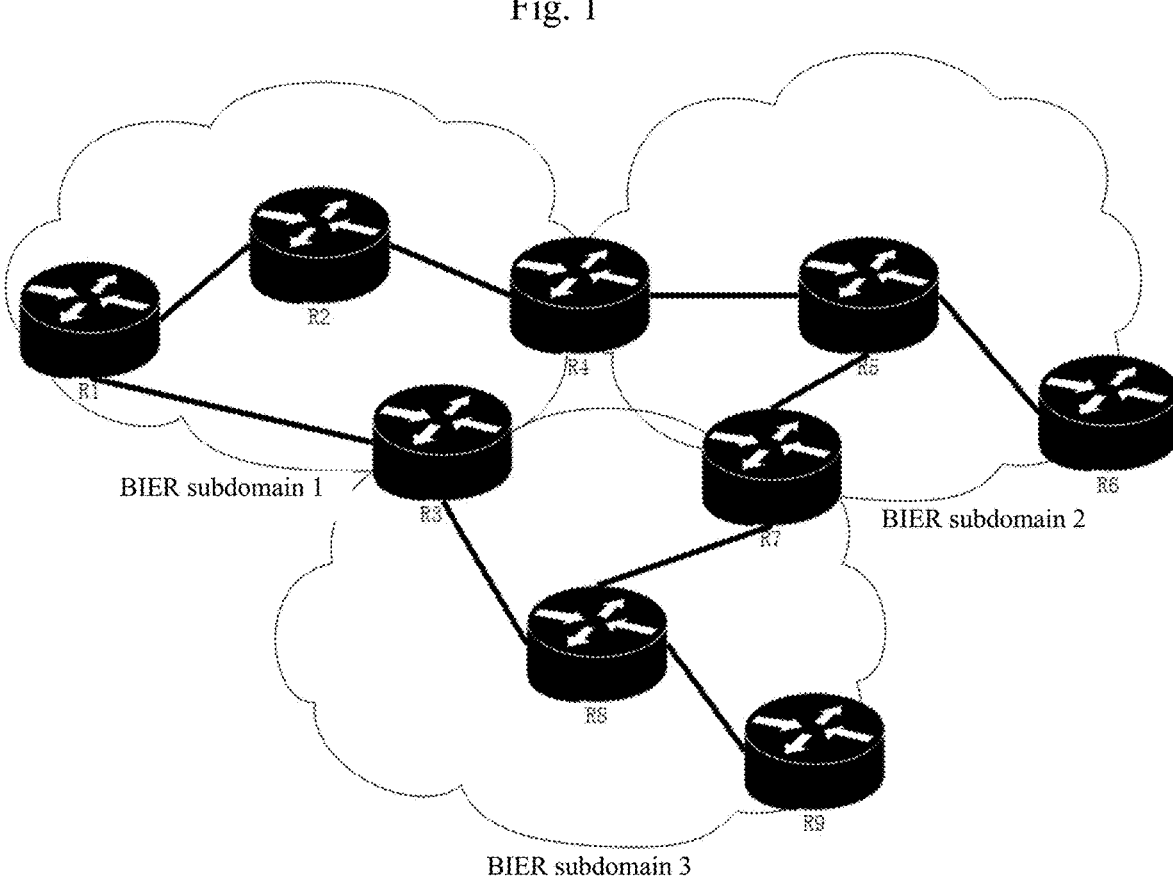
FIG. 2 is a diagram of networking of a plurality of BIER subdomains according to another embodiment of the present disclosure.

FIG. 2 is a diagram of networking of a plurality of BIER subdomains according to an embodiment of the present disclosure.

Compared with FIG. 1 which shows forwarding along a designated path in a single BIER subdomain, FIG. 2 shows forwarding along a designated path in a plurality of BIER subdomains. It can be understood that when the designated path spans multiple subdomains, it is necessary to identify each routing node with a subdomain ID and a bfd-id. For example, in FIG. 2, identification information of the node R1 is (subdomain id:1, bfd-id:1), and identification information of the node R5 is (subdomain id:2, bfd-id:5).

It can be understood that a specific target router can be uniquely determined according to a subdomain ID and a router ID (bfd-id). In addition, ID labels in the figure are merely for better illustrating the characteristics of the BIER network. In general, node information stored in the bitstring exists in the form of a binary string.

FIG. 3 is a structural diagram of a BIER subdomain segment list in a BIER segment list structure in a BIER packet according to another embodiment of the present disclosure.

A bfr-id-list packet structure in FIG. 3 corresponds to the BIER subdomain segment list structure in the BIER packet in the method for forwarding a BIER packet according to the present disclosure. The BIER subdomain segment list structure corresponds to router IDs of all routing nodes located in the designated forwarding path in the BIER subdomain, i.e., bfr-ids. In addition, in FIG. 3, subdomain-id represents the ID of the subdomain to which the routing nodes belong, and bfr-id-num represents the number of bfr-ids following it.

FIG. 4 is a diagram showing a BIER segment list structure in a BIER packet according to an embodiment of the present disclosure.

FIG. 4 shows a packet structure of the BIER segment list. The BIER segment list is located after the BIER packet header in the BIER packet. In FIG. 4, bfr-id-list-num represents the number of BIER subdomain segment lists included in the BIER segment list, and protocol represents a protocol field of the BIER segment list and is used for parsing and processing a service packet following the BIER packet.

It can be understood that the FIG. 3 and FIG. 4 are described in advance only to better illustrate the technical scheme proposed in the present disclosure, and the packet structures proposed in FIG. 3 and FIG. 4 are also inventive points of the present disclosure, and can achieve the effect of forwarding along a designated path according to the method for forwarding a BIER packet in the present disclosure.

FIG. 5 is a flowchart of steps of a method for forwarding a BIER packet, which is applied to a first node, according to an embodiment of the present disclosure. The method for forwarding a BIER packet includes, but not limited to, the following steps S510 to S530.

At S510, a first BIER packet generated by a third node is received, where the first BIER packet includes a first BIER packet header and a BIER segment list, the first BIER packet header includes first node information, and the BIER segment list includes second node information.

It can be understood that the first node represents a node that a packet forwarded in the BEIR network is designated to pass through, and the first node can parse the first BIER packet and acquire information included in the first BIER packet.

It can be understood that the first BIER packet represents a packet parsed out from a datagram obtained by the first node from a data link, and the first BIER packet represents a packet segment in which information corresponding to the first node is encapsulated. Address information of the first node is determined according to the first BIER packet. The first BIER packet includes the first BIER packet header and the BIER segment list. The first BIER packet header is a BIER packet header corresponding to the first node. The BIER segment list represents data information for subsequently determining a segment forwarding path.

It should be noted that the BIER packet header includes target node information, the target node information represents BFER node information corresponding to the BIER packet corresponding to the BIER packet header, the BIER segment list includes the second node information, and a second node corresponding to the second node information represents a node designated after the first node in the designated forwarding path. It can be understood that the second node is a BFER node corresponding to a BIER packet generated at the first node.

At S520, the first node information in the first BIER packet header is changed into the second node information to obtain a second BIER packet header.

It can be understood that the first node information represents target node information of the first BIER packet, the target node information is BFER node information corresponding to the BIER packet, and a BFER node corresponding to the BFER node information is the second node. The target node information of the first BIER packet header is changed to the second node information to obtain the second BIER packet header, and the function of forwarding the packet to the corresponding target node segment-by-segment is realized according to the second BIER packet header.

It should be noted that the action of encapsulating a BIER header is a BIER standard behavior, which is described in detail in RFC8296 and is not an inventive point of the present disclosure. In addition, a protocol field of the BIER header corresponds to a BIER segment list type, and data in the BIER segment list can be parsed according to the protocol field of the BIER header.

In an embodiment, in the forwarding path, except a final destination node, each BIER routing node can be used as the first node to forward the packet to the corresponding target node according to the BIER packet header, thus realizing the segment routing function.

At S530, a second BIER packet corresponding to the second BIER packet header is forwarded to a second node corresponding to the second node information.

It can be understood that according to the characteristic of BIER that a bitstring identifying destination nodes is carried in a packet to identify receivers, the address of the target router can be determined in the case of using different encapsulation technologies. Based on segment information in the BIER segment list, a path address of a target router can be determined for packets in a BIER network that need to pass through IPv6, IPv4, MPLS, and other networks, thereby realize a segment routing function.

It can be understood that the BIER encapsulation mode may vary in each link during the forwarding process in the BIER network.

In an embodiment, after each forwarding step according to segments, the target node corresponding to the previous first node becomes the current first node, and packet header re-encapsulation is performed according to second node information of the target node corresponding to the current first node in the BIER segment list, to obtain a second BIER packet header corresponding to the second node. According to the second BIER packet header, forwarding to the second node is implemented. For example, referring to FIG. 1, a designated service needs to be forwarded along a designated path passing through nodes R1, R2, R4, R6, and R8. R1, R2, R4, and R6 are first nodes. When the node R2 is the first node receiving a first BIER packet forwarded by the node R1, a first BIER packet header of the first BIER packet includes node information corresponding to the node R2, and a BIER segment list of the first BIER packet includes information of R2, R4, R6, and R8. The node information corresponding to the node R2 in the first BIER packet header of the first BIER packet is changed to node information corresponding to R4, and the information corresponding to R2 included in the BIER segment list of the first BIER packet is popped out to obtain a second BIER packet header corresponding to R4. The first BIER packet is forwarded to the node R4 according to the second BIER packet header. After receiving the first BIER packet, R4 becomes a new first node and continues to forward the first BIER packet according to the above method, thereby realizing the segment routing function.

Referring to FIG. 6, in an embodiment, S520 in the embodiment shown in FIG. 5 further includes, but not limited to. the following steps S610 and S620.

At S610, the second node information in the BIER segment list is popped out.

At S620, the first node information in the first BIER packet header is changed into the second node information to obtain a second BIER packet header.

In an embodiment, the second node information in the BIER segment list is popped out, and the target node information in the first BIER packet header is changed to the second node information to obtain a second BIER packet header. The BIER segment list includes a packet structure shown in FIG. 4. The BIER segment list includes the routing node information corresponding to each of nodes that the forwarding path subsequently passes through. In each process of changing the target node information in the first BIER packet header to the second node information to obtain the second BIER packet header, the second node information is obtained according to the BIER segment list, and the target node information in the first BIER packet header is changed to the second node information, to obtain a new second BIER packet header. In addition, the second node information in the BIER segment list is popped out, indicating that the BIER segment list includes routing node information corresponding to each of the nodes that the forwarding path subsequently passes through except the current corresponding target node, i.e., the BIER segment list includes target node information corresponding to the second node when the second node serves as a first node.

It can be understood that in the packet forwarding process, the BIER segment list varies with the BIER routing node that the BIER packet passes through, thereby realizing the segment routing function.

Referring to FIG. 7, in an embodiment, the BIER segment list further includes third node information, and S610 in the embodiment shown in FIG. 6 further includes, but not limited to, a following step S710.

At S710, the second node information at a head of the BIER segment list is popped out, where the BIER segment list includes the second node information and the third node information arranged in sequence.

In an embodiment, the BIER segment list further includes third node information, and a third node corresponding to the third node information is a target node corresponding to the second node serving as the first node. When the BIER segment list further includes the third node information, the second node information and the third node information in the BIER segment list are arranged according to a node designation order of the forwarding path. The node designation order of the forwarding path refers to an order in which a processor designates the routing nodes on the forwarding path according to the service. For example, in FIG. 1, a service one needs to be forwarded along a designated path that passes through nodes R1, R2, R4, R6, and R8, and the node designation order is R1→R2→R4→R6→R8. Popping out the second node information at a head of the BIER segment list means that the second node information of the corresponding target node is located at the head of the BIER segment list, and the node information in the BIER segment list is sorted from front to back according to the node designation order.

It should be noted that the BIER segment list includes a plurality of pieces of node information respectively representing designated nodes that the forwarding path passes through.

It can be understood that when the BIER segment list includes a plurality of pieces of node information, the second node information and the third node information in the BIER segment list are arranged in the node designation order of the forwarding path, and the second node information at the head of the BIER segment list is popped out, such that the target node corresponding to each first node can be determined segment-by-segment, thereby realizing the segment routing function in the BIER network.

Referring to FIG. 8, in an embodiment, the second node information includes BFR-ids and a BIER subdomain ID, and S710 in the embodiment shown in FIG. 7 further includes, but not limited to, a following step S810.

At S810, the second node information at a head of a BIER subdomain segment list in the BIER segment list is popped out, where the BIER subdomain segment list includes the BFR-ids of a plurality of BIER routers having the same subdomain ID.

In an embodiment, each piece of node information includes a BFR-id and a BIER subdomain ID. Referring to FIG. 3 and FIG. 4, in the case of segment forwarding in a single BIER subdomain, the node information exists in the form of the packet structure in FIG. 4. The BIER segment list includes a BIER subdomain segment list (bfr-id-list) shown in FIG. 3. Subdomain-id in FIG. 3 corresponds to the BIER subdomain ID, and addresses of target routers are determined according to BFR-ids and the BIER subdomain ID in the BIER packet header for forwarding.

It can be understood that the BIER subdomain segment list includes the BFR-ids of a plurality of BIER routers having the same subdomain ID, to represent BIER routing nodes for segment forwarding in the single BIER subdomain.

In an embodiment, the BIER segment list further includes a first BIER subdomain segment list and a second BIER subdomain segment list. Second node information at a head of the first BIER subdomain segment list at the head of the BIER segment list is popped out. The first BIER subdomain segment list and the second BIER subdomain segment list in the BIER segment list are arranged in the node designation order of the forwarding path.

In an embodiment, the BIER segment list and the BIER subdomain segment list are each stored in the form of a queue data structure. When the node information at the head is popped out, information following the node information in the BIER segment list and the BIER subdomain segment list is indented to the head to form a new head.

In an embodiment, referring to FIG. 4, when the BIER segment list includes a plurality of BIER subdomain segment lists, the BIER subdomain segment lists in the BIER segment list are arranged in the node designation order of the forwarding path, and the second node information at the head of the first BIER subdomain segment list at the head of the BIER segment list is popped out, such that the target node corresponding to each first node can be determined segment-by-segment, thereby realizing the segment routing function in the BIER network.

Referring to FIG. 9, in an embodiment, after S810 in the embodiment shown in FIG. 8, the method further includes, but not limited to, a following step S910.

At S910, the first BIER subdomain segment list is popped out, the second BIER subdomain segment list is changed to the head of the BIER subdomain segment list, and fourth node information is changed to information corresponding to a target node that the second node needs to forward.

In an embodiment, the BIER segment list includes a plurality of BIER subdomain segment lists, and when a BIER subdomain segment list does not include node information, the BIER subdomain segment list is popped out.

It can be understood that to ensure that the BIER subdomain segment list at the head of the BIER segment list includes corresponding second node information after the first node receives the first BIER packet, it is necessary to pop out the BIER subdomain segment list that does not include the second node information. In this way, it is ensured ensure that the first node can directly acquire corresponding second node information by reading the BIER subdomain segment list at the head of the BIER segment list after receiving the first BIER packet, thereby realizing the segment forwarding function.

Referring to FIG. 10, in an embodiment, based on any one of the embodiments shown in FIG. 5 to FIG. 9, the first BIER packet header further includes a first protocol, and S510 in the embodiment shown in FIG. 5 further includes, but not limited to, a following step S1010.

At S1010, the BIER segment list is parsed according to the first protocol to obtain the second node information.

In an embodiment, a BIER segment list type is added to the protocol field in the BIER packet header, to indicate that the BIER packet header is followed by a BIER segment list. After receiving the first BIER packet, the first node parses the BIER segment list according to the first protocol included in the first BIER packet header to obtain the second node information. The first protocol may be any protocol corresponding to the encapsulation mode of the BIER segment list, and may be adjusted by those having ordinary skills in the art according to actual situations.

In an embodiment, in the packet forwarding process, the type of BIER segment list is fixed.

Referring to FIG. 11, in an embodiment, after S1010 in the embodiment shown in FIG. 10, the method further includes, but not limited to, the following steps S1110 and S1120.

At S1110, the BIER segment list is popped out if the BIER segment list does not include the second node information.

At S1120, the first protocol is changed to the second protocol, where the second protocol is used for a service packet coming after the first BIER packet.

It can be understood that to ensure that the node information at the head of the BIER segment list includes corresponding second node information after the first node receives the service packet, it is necessary to pop out the BIER segment list that does not include the second node information. In this way, it is ensured ensure that the first node can directly acquire corresponding second node information by reading the node information at the head of the BIER segment list after receiving the service packet, thereby realizing the segment forwarding function.

In an embodiment, the BIER packet is followed by a service packet, which is a packet to be processed by the final destination node. For example, referring to FIG. 1, the service one needs to be forwarded through a designated path that passes through nodes R1, R2, R4, R6, and R8, and R8 is the final destination node. In addition, the first protocol is changed to the second protocol for the service packet coming after the first BIER packet, to prepare for subsequent service processing.

In an embodiment, when the BIER segment list is popped out, the service packet is parsed according to the first protocol in the BIER packet header to obtain service information, and service processing is performed according to the service information.

In an embodiment, after receiving the service packet, the first node checks whether the BIER segment list is empty. When the BIER segment list is empty, it indicates that the service packet has reached the final destination node, and the current first node is the final destination node. The service packet is parsed according to the first protocol in the BIER packet header to obtain service information, and service processing is performed according to the service information. The service packet may be any packet that needs to be processed through the segment routing function.

In an embodiment, when a BIER router corresponds to a plurality of subdomain IDs, a target subdomain ID corresponding to the BIER router is determined according to the forwarding path, and the BIER router is added to a corresponding BIER route segment list according to the target subdomain ID.

In an embodiment, when one BIER router corresponds to a plurality of subdomain IDs, a target subdomain ID corresponding to the BIER router is determined according to the forwarding path, the BIER router is added to a corresponding BIER route segment list according to the target subdomain ID, and a unique BFR-id and subdomain ID corresponding to each BIER router in the BIER segment list are determined.

In an embodiment, a target subdomain ID corresponding to the BIER router is determined according to the forwarding path, and the BIER router is added to a corresponding BIER route segment list according to the target subdomain ID. For example, in FIG. 2, a service one needs to be forwarded through a designated path passing through nodes R1, R2, R4, R5, and R6, where R1 and R2 belong to a BIER subdomain 1, R5 and R6 belong to a BIER subdomain 2, and R4 belongs to both the subdomains 1 and 2. For convenience of processing, the subdomain 1 is used as a target subdomain ID corresponding to R4, and R4 is added to a BIER route segment list corresponding to the subdomain 1.

It should be noted that devices in different BIER subdomains may have the same bfr-id according to standards. For convenience of description, each device is assigned a different bfr-id.

In an embodiment, referring to FIG. 3 and FIG. 4, the BIER segment list further includes a subdomain quantity which represents the number of subdomains in the forwarding path that the packet has not passed through, and the subdomain ID list further includes subdomain IDs corresponding to the subdomains and a quantity of intra-domain routers corresponding to each subdomain.

In an embodiment, forwarding paths corresponding to the first node and the second node include a strict path and a loose path. The strict path means that the first node is immediately adjacent to the second node in the BIER network. The loose path means that several BIER routers that are not designated by the forwarding path exist between the first node and the second node in the BIER network.

FIG. 12 is a flowchart of steps of a method for forwarding a BIER packet, which is applied to a third node, according to another embodiment of the present disclosure. The method for forwarding a BIER packet includes, but not limited to, the following steps S1210 and S1220.

At S1210, a first BIER packet is obtained according to a designated forwarding path, where the first BIER packet includes a first BIER packet header and a BIER segment list, the first BIER packet header includes first node information, and the BIER segment list includes second node information.

At S1220, the first BIER packet is forwarded to a first node corresponding to the first node information according to the first BIER packet header, where a second BIER packet generated at the first node includes the second node information.

In an embodiment, the third node is a source node of the designated forwarding path. For example, referring to FIG. 1, the service one needs to be forwarded through a designated path that passes through nodes R1, R2, R4, R6, and R8, and R1 is the third node.

In an embodiment, the third node obtains a first BIER packet according to a designated forwarding path, where the first BIER packet includes a first BIER packet header and a BIER segment list, target node information in the first BIER packet header includes first node information, and the BIER segment list includes second node information; and forwards the first BIER packet to a first node corresponding to the first node information according to the first BIER packet header, where target node information in a second BIER packet generated at the first node includes the second node information. As such, the segment routing function in the BIER network is realized.

In an embodiment, a packet construction method using another BIER segment list structure is provided. The BIER segment list structure does not include the protocol field, and the BIER segment list is placed in a generic fragmentation header. The protocol field in the BIER header is filled with a generic fragmentation header protocol type, and Next Header in the generic fragmentation header is filled with the type of the service packet. In this way, an effect of parsing the BIER segment list and the service packet is achieved, and the segment routing function is realized.

FIG. 13 is a detailed flowchart of step S1210 in FIG. 12 according to another embodiment of the present disclosure. When the BIER segment list further includes a first BIER subdomain segment list and a second BIER subdomain segment list, and the segment list includes second node information and third node information, S1210 includes, but not limited to, a following step S1310.

At S1310, a BIER segment list is generated according to the designated forwarding path, where the BIER segment list includes third node information, the first node information, and the second node information arranged in sequence.

FIG. 14 is a detailed flowchart of step S1210 in FIG. 12 according to another embodiment of the present disclosure. S1210 includes, but not limited to, a following step S1410.

At S1410, a BIER segment list is generated according to the designated forwarding path, where the BIER segment list includes a segment list of the first BIER subdomain and a segment list of the second BIER subdomain arranged in sequence, the segment list of the first BIER subdomain includes the first node information corresponding to the first node, and the segment list of the second BIER subdomain includes the second node information corresponding to the second node.

In an embodiment, each piece of node information includes a BFR-id and a BIER subdomain ID. Referring to FIG. 3 and FIG. 4, in the case of segment forwarding in a plurality of BIER subdomain, the node information exists in the form of the packet structure in FIG. 4. The BIER segment list includes a plurality of BIER subdomain segment lists (bfr-id-lists), each having the structure shown in FIG. 3. Subdomain-id in FIG. 3 corresponds to the BIER subdomain ID, and addresses of target routers are determined according to BFR-ids and the BIER subdomain ID in the BIER packet header for forwarding.

In an embodiment, the BIER segment list includes a first BIER subdomain segment list and a second BIER subdomain segment list which are arranged in a node designation order of the forwarding path. The node designation order of the forwarding path refers to an order in which a processor designates subdomain IDs corresponding to the routing nodes on the forwarding path according to the service. For example, in FIG. 2, the service one needs to be forwarded along a designated path that passes through nodes R1, R2, R4, R5, and R6, and the node designation order is R1→R2→R4→R5→R6. The BIER subdomain 1 and the BIER subdomain 2 corresponding to R1, R2, R4, R5, and R6 correspond to the order of subdomain IDs. Popping out the second node information at the head of the first BIER subdomain segment list at the head of the BIER segment list means that the second node information of the corresponding target node at the head of the first BIER subdomain segment list is located at the head of the BIER segment list, and the node information in the BIER segment list is sorted from front to back according to the node designation order.

FIG. 15 is a flowchart of additional steps of the method in FIG. 12 according to another embodiment of the present disclosure. The method for forwarding a BIER packet includes, but not limited to, the following steps S1510 and S1520.

At S1510, a target subdomain ID corresponding to the BIER router is determined according to the designated forwarding path.

At S1520, the BIER router is added to a corresponding BIER subdomain segment list according to the target subdomain ID.

In an embodiment, when one BIER router corresponds to a plurality of subdomain IDs, a target subdomain ID corresponding to the BIER router is determined according to the forwarding path, the BIER router is added to a corresponding BIER route segment list according to the target subdomain ID, and a unique BFR-id and subdomain ID corresponding to each BIER router in the BIER segment list are determined.

In an embodiment, a target subdomain ID corresponding to the BIER router is determined according to the forwarding path, and the BIER router is added to a corresponding BIER route segment list according to the target subdomain ID. For example, in FIG. 2, a service one needs to be forwarded through a designated path passing through nodes R1, R2, R4, R5, and R6, where R1 and R2 belong to a BIER subdomain 1, R5 and R6 belong to a BIER subdomain 2, and R4 belongs to both the subdomains 1 and 2. For convenience of processing, the subdomain 1 is used as a target subdomain ID corresponding to R4, and R4 is added to a BIER route segment list corresponding to the subdomain 1.

It should be noted that devices in different BIER subdomains may have the same bfr-id according to standards. For convenience of description, each device is assigned a different bfr-id.

FIG. 16 is a flowchart of steps of a method for forwarding a BIER packet, which is applied to a fifth node, according to another embodiment of the present disclosure. The method for forwarding a BIER packet includes, but not limited to, the following steps S1610 to S1630.

At S1610, a first BIER packet is received, where the first BIER packet includes a first BIER packet header, and the first BIER packet header includes first node information.

At S1620, it is determined according to the first node information whether the fifth node is a first node corresponding to the first node information.

At S1630, the first BIER packet is forwarded to the first node when the fifth node is not the first node.

It can be understood that during forwarding in the BIER network, there is a BFR router that only forwards a service but does not process the service, and the fifth node is such a BFR router. To distinguish such BFR routers from first nodes serving as BFERs, it is determined whether the routing node is a first node by comparing the target node information with the current node information.

In an embodiment, a first BIER packet is received, where the first BIER packet includes a first BIER packet header table, and target node information in the BIER packet header includes first node information; it is determined whether a routing node is a first node according to the target node information; and when the routing node is not the first node, the first BIER packet is forwarded to the first node, and the first BIER packet is processed at the first node. As such, the segment routing function is realized.

Figure 17:
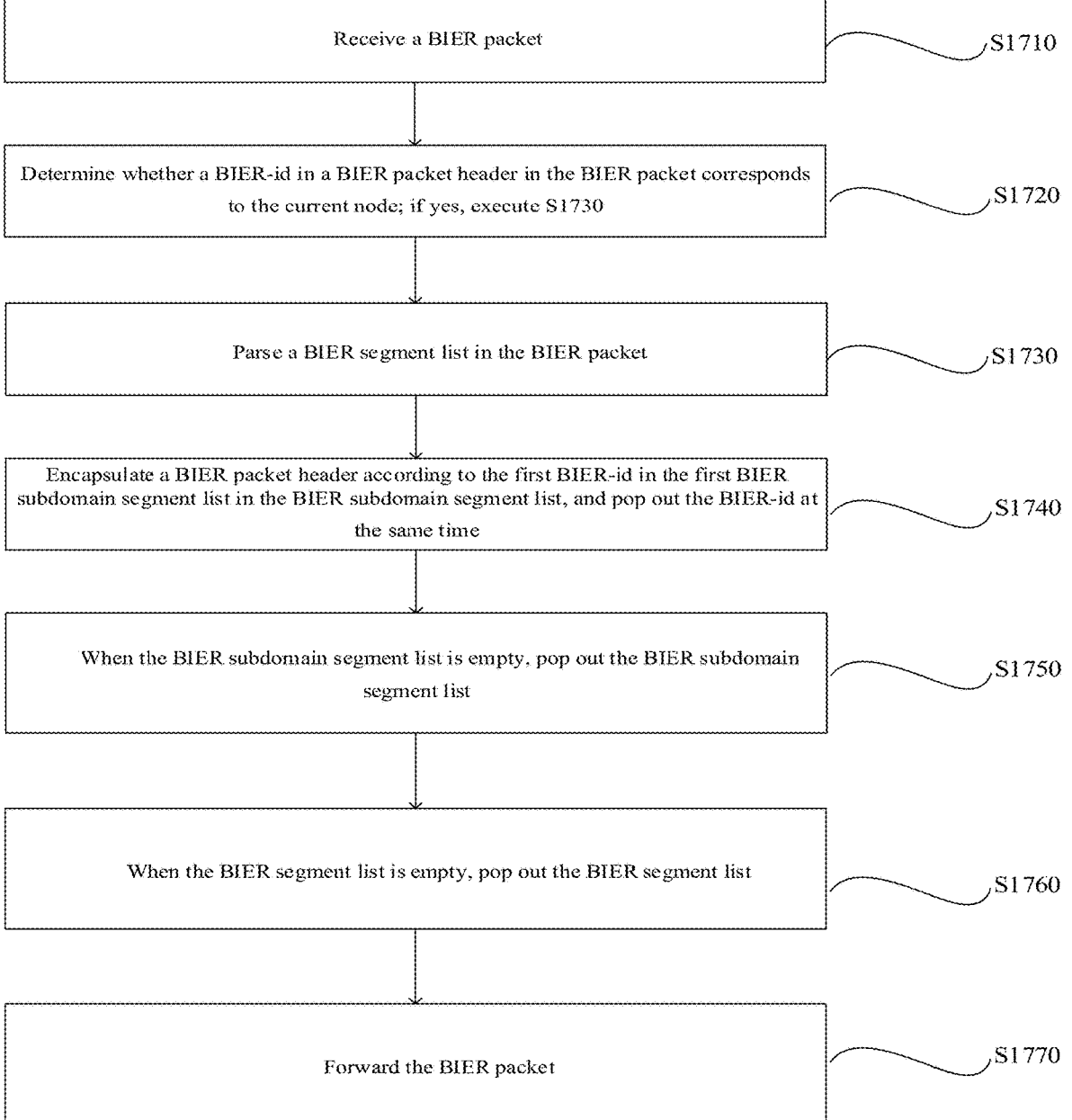
FIG. 17 is an example diagram of a method for forwarding a BIER packet by a first node according to another embodiment of the present disclosure.

FIG. 17 is an example diagram of forwarding along a designated path by using the method for forwarding a BIER packet according to another embodiment of the present disclosure, which includes, but not limited to, the following steps S1710 to S1770.

At S1710, a BIER packet is received.

At S1720, it is determined whether a BFR-id in a BIER packet header in the BIER packet corresponds to the current node; if yes, S1730 is executed.

At S1730, a BIER segment list in the BIER packet is parsed.

At S1740, a BIER packet header is encapsulated according to the first BFR-id in the first BIER subdomain segment list in the BIER segment list, and the BFR-id is popped out at the same time.

At S1750, when the BIER subdomain segment list is empty, the BIER subdomain segment list is popped out.

At S1760, when the BIER segment list is empty, the BIER segment list is popped out.

At S1770, the BIER packet is forwarded.

In an embodiment, a process from generation to forwarding of a BIER packet in a single BIER subdomain is as follows. A bfr-id-list structure is defined as shown in FIG. 3, which includes, but not limited to, subdomain-id (BIER subdomain ID), bfr-id-num (representing the number of following bfr-ids), and a bfr-id list. A BIER segment list structure is defined as shown in FIG. 4, which includes, but not limited to, bfr-id-list-num (representing the number of following bfr-id-lists), protocol (representing a packet type after the segment list structure), and a bfr-id-list list. A BIER segment list type is added to the protocol field in the BIER packet header, to indicate that the BIER packet header is followed by a BIER segment list. For networking in a single BIER subdomain as shown in FIG. 1, it is assumed that the subdomain ID is 1, and bfr-ids of nodes R1 to R8 are 1 to 8 respectively. From R1 to R8, a designated path one is R1→R2→R4→R6→R8, and a designated path two is R1→R3→R5→R7→R8. A packet of the service one is forwarded from R1 to R8, and the packet of the service one is designated through a controller or a device configuration interface or by a network administrator to be forwarded through the path one. In this case, a packet is constructed at R1. The first node R1 of the path one is searched. When it is found that the first node R1 is the current node, then it is skipped. The BIER packet header is followed by a BIER segment list, where the bfr-id-list-num field is filled with 1, and the protocol field is filled with a protocol type of the packet of the service one. The protocol field is followed by a bfr-id-list structure with a subdomain-id field of 1, a bfr-id-num field of 3, followed by three bfr-ids with values of 4, 6, and 8 in sequence. The bfr-id-list structure is followed by a service packet. After the BIER packet arrives at R2, it is found that the bfr-id in the packet is the current node, and subsequent BIER segment lists are parsed. The BIER subdomain ID 1 is removed, the first bfr-id which is 4 is removed, and a new BIER packet header is constructed to continue BIER forwarding. In addition, in the bfr-id-list structure of the BIER segment list, the bfr-id-num is changed to 2, the bfr-id 4 is popped out, and only bfr-ids 6 and 8 are left. After the BIER packet arrives at R4, the above steps are repeated. In the bfr-id-list structure of the BIER segment list, the bfr-id-num is changed to 1, the bfr-id 6 is popped out, and only bfr-id 8 is left. After the BIER packet arrives at R6, the above steps are repeated. After the last bfr-id, i.e., bfr-id 8 is popped out, the bfr-id-list is empty, and then the bfr-id-list is popped out. Further, when a BIER segment list is empty, the BIER segment list is also popped out. The protocol field in the BIER packet header is filled with a protocol identifier of the service packet. In this case, the packet becomes BIER packet header+service packet. After the BIER packet arrives at R8, it is found that the bfr-id in the packet is the current node, and parsing and processing of the service packet are performed. It can be understood that a packet of a service two may also be designated to be forwarded along the path two, which can be realized by repeating the above steps.

It can be understood that corresponding to the process from generation to forwarding of a BIER packet in a single BIER subdomain, a process from generation to forwarding of a BIER packet in multiple BIER subdomains is as follows. In the scenario of networking in multiple BIER subdomains as shown in FIG. 2, it is assumed that the subdomain ID of the BIER subdomain 1 is 1, the subdomain ID of the BIER subdomain 2 is 2, and the subdomain ID of the BIER subdomain 3 is 3. The node R3 is in both the BIER subdomain 1 and the BIER subdomain 3, the node R4 is in both the BIER subdomain 1 and the BIER subdomain 2, and the node R7 is in both the BIER subdomain 2 and the BIER subdomain 3. bfr-ids of R1 to R9 are 1 to 9 respectively. In the scenario of networking in multiple BIER subdomains as shown in FIG. 2, a path one from R1 to R6 is R1→R2-R4-R5-R6, and a path two from R1 to R6 is R1→R3→R8→R7→R5→R6. A packet of the service one is forwarded from R1 to R6, and the packet of the service one is designated through a controller or a device configuration interface or by a network administrator to be forwarded through the path two. In this case, a packet is constructed at R1. The first node of the path two is searched. When it is found that the first node R1 is the current node, the current node is skipped. The second node of the path two is searched. BIER forwarding information of R3 (BIER subdomain 1, bfr-id 3) is found, and a BIER packet header is encapsulated (where this action of encapsulating the BIER packet header is a BIER standard behavior, which is described in detail in RFC8296 and is not an inventive point of the present disclosure). The protocol field of the BIER packet header is filled with a BIER segment list type. The BIER packet header is followed by a BIER segment list. Because the nodes that the path will pass through subsequently are in two BIER subdomains, two bfr-id-lists are carried, and the bfr-id-list-num field in the segment list is filled with 2, and the protocol field is filled with the protocol type of the packet of the service one. The protocol field is followed by two bfr-id-list structures. In the first bfr-id-list, subdomain-id is 3, and bfr-id-num is 2, followed by two bfr-ids with values of 8 and 7 in sequence. In the second bfr-id-list, the subdomain-id field is 2, and bfr-id-num is 2, followed by two bfr-ids with values of 5 and 6 in sequence. The rest of the process is the same as that described in the embodiment of the process from generation to forwarding of the BIER packet in a single BIER subdomain, so the details will not be repeated herein.

Figure 18:
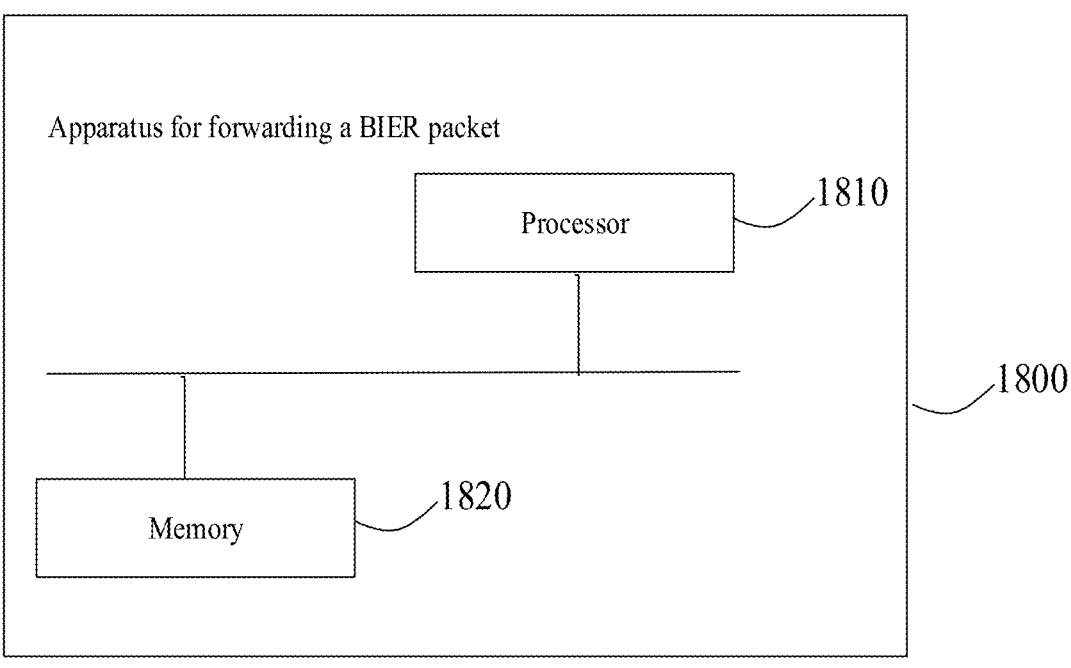
FIG. 18 is a schematic diagram of an apparatus for forwarding a BIER packet according to another embodiment of the present disclosure.

Referring to FIG. 18, an embodiment of the present disclosure provides an apparatus 1800 for forwarding a BIER packet. The apparatus 1800 includes a memory 1820, a processor 1810, and a computer program stored in the memory 1820 and executable by the processor 1810. The computer program, when executed by the processor 1810, causes the processor 1810 to implement the method for forwarding a BIER packet according to any one of the above embodiments, for example, implement the method steps S510 to S530 in FIG. 5, the method steps S610 to S620 in FIG. 6, the method step S710 in FIG. 7, the method step S810 in FIG. 8, the method step S910 in FIG. 9, the method step S1010 in FIG. 10, the method steps S1110 to S1120 in FIG. 11, the method steps S1210 to S1230 in FIG. 12, the method step S1310 in FIG. 13, the method step S1410 in FIG. 14, the method steps S1510 to S1520 in FIG. 15, the method steps S1610 to S1630 in FIG. 16, or the method steps S1710 to S1770 in FIG. 17.

In addition, an embodiment of the present disclosure provides a computer-readable storage medium, storing a computer-executable instruction which, when executed by one or more control processors, causes the one or more control processors to, for example, execute the method steps S510 to S530 in FIG. 5, the method steps S610 to S620 in FIG. 6, the method step S710 in FIG. 7, the method step S810 in FIG. 8, the method step S910 in FIG. 9, the method step S1010 in FIG. 10, the method steps S1110 to S1120 in FIG. 11, the method steps S1210 to S1230 in FIG. 12, the method step S1310 in FIG. 13, the method step S1410 in FIG. 14, the method steps S1510 to S1520 in FIG. 15, the method steps S1610 to S1630 in FIG. 16, or the method steps S1710 to S1770 in FIG. 17.

Embodiments of the present disclosure provide a method and apparatus for forwarding a BIER packet, and a storage medium. The method for forwarding a BIER packet is applied to a first node and includes: receiving a first BIER packet generated by a third node, where the first BIER packet includes a first BIER packet header and a BIER segment list, the first BIER packet header includes first node information, and the BIER segment list includes second node information; changing the first node information in the first BIER packet header into the second node information to obtain a second BIER packet header; and forwarding a second BIER packet corresponding to the second BIER packet header to a second node corresponding to the second node information. Based on the feature of determining target nodes according to forwarding path information encapsulated in the BIER packet header, a segment list is added after the BIER packet header, such that the target nodes can be changed in the process of segment forwarding. In this way, a segment routing function is achieved in a BIER network supporting various encapsulation types, to realize a function of forwarding along a designated path in the BIER network.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some implementations of the present disclosure have been described above, the present disclosure is not limited to the implementations described above. Those having ordinary skills in the art can make various equivalent modifications or replacements without departing from the protection scope of the present disclosure. Such equivalent modifications or replacements fall within the protection scope defined by the claims of the present disclosure.

What is claimed is:

1. A method for forwarding a Bit Index Explicit Replication (BIER) packet, applied to a first node, the method comprising:

receiving a first BIER packet generated by a third node, wherein the first BIER packet comprises a first BIER packet header and a BIER segment list, the first BIER packet header comprises first node information, and the BIER segment list comprises second node information in a first BIER subdomain segment list and fourth node information in a second BIER subdomain segment list, the second node information and the fourth node information are arranged in sequence, the second node information comprises Bit Forwarding Router (BFR)-ids and a BIER subdomain ID;

popping out the second node information at a head of a BIER subdomain segment list in the BIER segment list, wherein the BIER subdomain segment list comprises the BFR-ids of a plurality of BIER routers having the same subdomain ID;

popping out the first BIER subdomain segment list, changing the second BIER subdomain segment list to the head of the BIER subdomain segment list, and changing the fourth node information to information corresponding to a target node that a second node needs to forward;

changing the first node information in the first BIER packet header into the second node information to obtain a second BIER packet header; and forwarding a second BIER packet corresponding to the second BIER packet header to the second node corresponding to the second node information.

2. The method of claim 1, wherein the first BIER packet header further comprises a first protocol, and receiving the first BIER packet generated by the third node comprises:

parsing the BIER segment list according to the first protocol to obtain the second node information.

3. The method of claim 2, wherein the BIER segment list further comprises a second protocol, and after changing the first node information in the first BIER packet header into the second node information to obtain the second BIER packet header, the method further comprises:

popping out the BIER segment list in response to the BIER segment list not comprising the second node information; and changing the first protocol to the second protocol, wherein the second protocol is used for a service packet coming after the first BIER packet.

4. A method for forwarding a Bit Index Explicit Replication (BIER) packet, applied to a third node, the method comprising:

obtaining a first BIER packet according to a designated forwarding path, wherein the first BIER packet comprises a first BIER packet header and a BIER segment list, the first BIER packet header comprises first node information, and the BIER segment list comprises second node information; and forwarding the first BIER packet to a first node corresponding to the first node information according to the first BIER packet header, wherein a second BIER packet generated at the first node comprises the second node information;

wherein in response to the designated forwarding path being a path formed by the third node, the first node, and a second node arranged in sequence, obtaining the first BIER packet according to the designated forwarding path comprises:

generating the BIER segment list according to the designated forwarding path, wherein the BIER segment list comprises third node information, the first node information, and the second node information arranged in sequence.

5. The method of claim 4, wherein in response to the designated forwarding path being a path formed by the third node, the first node, and the second node arranged in sequence, the first node being located in a first BIER subdomain, and the second node being located in a second BIER subdomain, obtaining the first BIER packet according to the designated forwarding path comprises:

generating the BIER segment list according to the designated forwarding path, wherein the BIER segment list comprises a segment list of the first BIER subdomain and a segment list of the second BIER subdomain arranged in sequence, the segment list of the first BIER subdomain comprises the first node information corresponding to the first node, and the segment list of the second BIER subdomain comprises the second node information corresponding to the second node.

6. The method of claim 4, wherein in response to a BIER router being corresponding to a plurality of subdomain IDs, the method further comprises:

determining a target subdomain ID corresponding to the BIER router according to the designated forwarding path; and adding the BIER router to a corresponding BIER subdomain segment list according to the target subdomain ID.

7. An apparatus for forwarding a Bit Index Explicit Replication (BIER) packet, comprising:

a memory, a processor, and a computer program stored in the memory and executable by the processor, wherein the computer program, when executed by the processor, causes the processor to perform the method for forwarding a BIER packet of claim 1.

8. A non-transitory computer-readable storage medium, storing a computer-executable instruction which, when executed by a processor, causes the processor to perform the method for forwarding a BIER packet of claim 1.

* * * * *